United States Patent [19]

Yamaki et al.

[11] Patent Number: 4,830,390
[45] Date of Patent: May 16, 1989

[54] FRONT FORK FOR BICYCLE

[75] Inventors: Hidenori Yamaki; Hironobu Kobayashi; Akio Minari, all of Ageo, Japan

[73] Assignee: Bridgestone Cycle Co., Ltd., Japan

[21] Appl. No.: 81,451

[22] Filed: Aug. 4, 1987

[30] Foreign Application Priority Data

Aug. 19, 1986 [JP] Japan .................... 61-192181

[51] Int. Cl.4 ............... B62K 19/32; B62K 21/04
[52] U.S. Cl. ............................................ 280/280
[58] Field of Search ............................ 280/279, 280

[56] References Cited

U.S. PATENT DOCUMENTS 4,479,662 10/1984 Defour et al. ............... 280/281 R

FOREIGN PATENT DOCUMENTS

| 598369 | 12/1925 | France | 280/279 |
| 48419 | 3/1938 | France | 280/280 |
| 10175 | of 1895 | United Kingdom | 280/279 |
| 723646 | 2/1955 | United Kingdom | 280/279 |

*Primary Examiner*—John A. Pekar
*Attorney, Agent, or Firm*—Arnold, White & Durkee

[57] ABSTRACT

A front fork for a bicycle comprises a stem tube, a shoulder lug and two fork tubes. The shoulder lug is made of a light metal alloy by casting. The stem tube is set in dies and the light metal alloy is poured into the dies so that part of the stem tube is embedded in the light metal alloy to form the shoulder lug and simultaneously the shoulder lug is integrally formed with fitting protrusions. The fitting protrusions of the shoulder lug are fitted in the fork tubes and joined thereto by an adhesive.

2 Claims, 3 Drawing Sheets

FIG_1
PRIOR ART
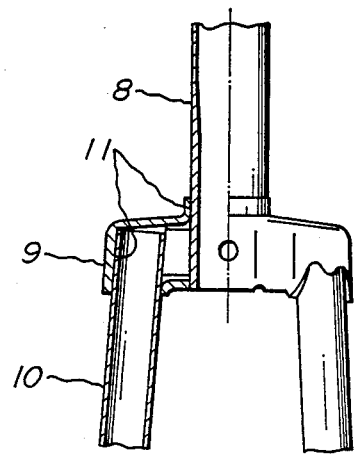
FIG_2
PRIOR ART
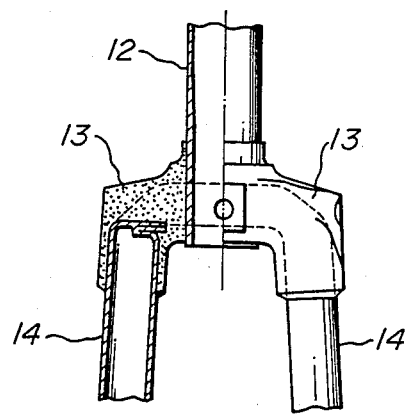

FIG_3
FIG_4
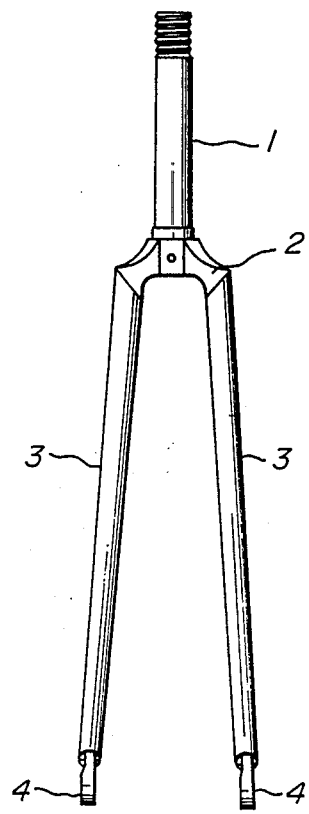
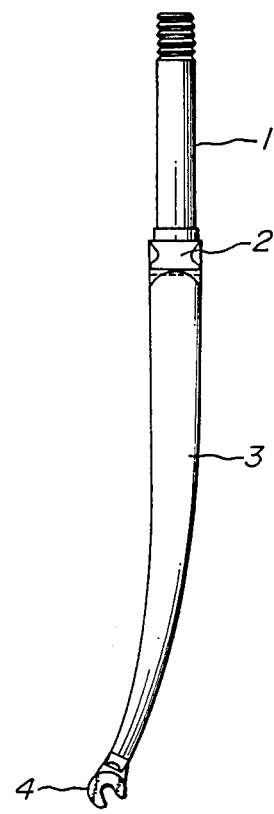

FIG_5
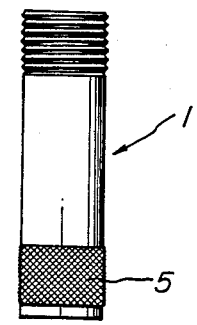
FIG_6
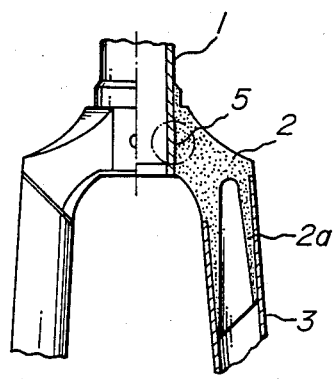
FIG_7
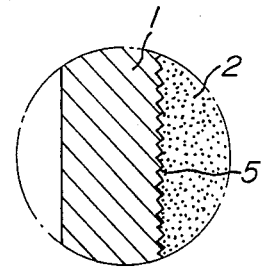

FRONT FORK FOR BICYCLE

BACKGROUND OF THE INVENTION

This invention relates to a front fork for a bicycle and more particularly to a front fork consisting of members jointed in an inventive manner.

Front forks for bicycles using tubes and plates have been generally used. One example is shown in FIG. 1, wherein a front fork consists of a stem tube 8, a lug 9 and fork tubes 10. The lug 9 is made of a steel by press-forming or lost wax process. The stem tube 8 and the fork tubes 10 are fitted in the lug 9. The lug 9 is heated at 900°-1000° C. as a whole to melt brazing alloy 11. The brazing alloy 11 is then solidified to joint these members.

FIG. 2 illustrates another example of a front fork which has been made by the assignee of this application with the aid of die casting. Fork tubes 14 are integrally made in a unitary body as shown in phantom lines and are jointed to a stem tube 12 by arc-welding. The jointed fork tubes and stem tube are then set in metal dies and a lug 13 is formed by die casting.

In a further hitherto used front fork (not shown), fork tubes are formed by bulging or press-forming and directly jointed to a stem tube by arc welding such as tig welding without using a lug.

The lastly mentioned front fork jointed by welding has been applied to particular uses owing to the shape as a whole and appearance of the jointed portion. On the other hand, the front forks shown in FIGS. 1 and 2 have been widely used because they are sufficiently superior in strength and appearance with particular consideration.

Moreover, U.S. Pat. No. 4,479,662 discloses a bicycle frame comprising tubes having tapered portions extending therefrom and adapted to be fitted in inner tapered portions of mating tubes and adhesive substance for jointing the fitted tapered portions.

The above front forks hitherto used have the following disadvantages.

With the front fork disclosed in FIG. 1, the lug 9 jointed by brazing is made of iron (steel) by pressing or lost wax process and the fork tubes 10 cannot be made of a light metal such as aluminum. Accordingly, it is impossible to make light the front fork. Moreover, the shape of the lug 9 made by pressing is limited to a uniform shape resulting from limitations of the producing method. Suitable clearances are required at the fitted portions of the tubes for the brazing alloy, so that the respective members must be worked with high accuracy before brazing. Furthermore, the respective members themselves are heated to the brazing temperature so that portion of the members which need not be heated are exposed to the high temperature for a long period of time to lower their strength. As a flux is used for brazing, after-treatment such as pickling, finishing or the like is required so that the time for the operation is elongated and use of a combination of different materials is difficult.

With the front fork using die casting disclosed in FIG. 2, the fork tubes 14 are a unitary body and the tubes 12 and 14 are insert-cast in the lug 13 so that the lug 13 becomes bulky and awkward. Therefore, an inner lug system cannot be employed and a smart and light appearance cannot be obtained.

Moreover, as the fork tubes 14 are insert-cast by the lug, wall thickness of the fork tubes 14 is required for resisting the casting pressure so that it is difficult to make light the frame and to employ different materials for the fork tubes.

In the front fork disclosed the U.S. Pat. No. 4,479,662, there are the tapered portions of the lug and fork tubes at their fitted portions. Therefore, cutting and expanding the tubes at the fitted portions are required to increase processing steps and to increase production cost resulting from the requirement of working accuracy.

SUMMARY OF THE INVENTION

It is an object of the invention to provide an improved front fork for a bicycle, which eliminates all the disadvantages of the prior art.

In order to achieve this object, the front fork for a bicycle according to the invention comprises a stem tube, a shoulder lug made of a light metal alloy by casting, said shoulder lug being jointed to said stem tube embedded therein by insert casting and said shoulder lug being simultaneously integrally formed with fitting protrusions by casting, and two fork tugs jointed to said fitting protrusions of the shoulder lug by an adhesive.

In a preferred embodiment, the stem tube is formed with a rough surface in a part thereof embedded in the shoulder lug.

According to the invention, in forming the shoulder lug by casting, the stem tube is jointed to the lug by insert casting of the lug and at the same time the lug is integrally formed with fitting protrusions. Thereafter, the fork tubes are fitted on the fitting protrusions and jointed thereto by an adhesive. There is no risk of decline of strength of components due to heating in brazing. Therefore, the front fork for a bicycle superior in durability is obtained. Moreover, the shoulder lug and fork tubes can be made of a light metal alloy, so that a lightweight front fork is obtained. As the shoulder lug is made by die casting, the freedom of external appearance and shape can be improved. Moreover, the shoulder lug and the fork tubes are jointed by an adhesive, so that different materials for these members may be used. According to the invention, furthermore, centering and finishing operations are avoided or mitigated to improve the productivity and to reduce the cost of equipment, thereby lowering the cost of manufacturing bicycles.

The invention will be more fully understood by referring to the following detailed specification and claims taken in connection with the appended drawings.

BRIEF DESCRIPTION OF THE DRAWINGS

FIG. 1 is a partial sectional view of a front fork of the prior art assembled by brazing;

FIG. 2 is a partial sectional view of a front fork of the prior art made by die casting;

FIG. 3 is a front view of a front fork according to the invention;

FIG. 4 is a side view of the front fork shown in FIG. 3;

FIG. 5 is a front elevation of a stem tube before insert casting according to the invention;

FIG. 6 is a partial sectional view illustrating a shoulder lug of the front fork shown in FIG. 3; and FIG. 7 is a partial enlarged sectional view of a jointed portion of the shoulder lug and the stem tube shown in FIG. 3.

DESCRIPTION OF THE PREFERRED EMBODIMENT

FIGS. 3-7 illustrate one embodiment of the invention, wherein a front fork comprises a stem tube 1, a shoulder lug 2 and fork tubes 3 having pawls 4.

According to the invention, the stem tube 1 is formed at a lower end with a rough surface 5 by knurling as shown in FIG. 5. The stem tube 1 is arranged in metal dies (not shown) for forming a shoulder lug 2. Under this condition of the dies, an aluminum alloy is poured into the dies to joint the stem tube 1 and the shoulder lug 2 integrally as a unitary body and simultaneously to form fitting protrusions 2a integral with the shoulder lug 2 and adapted to insert into the fork tubes 3. In his embodiment, the fitting protrusion is formed as a protrusion to be fitted in one of the fork tube. The stem tube 1 is embedded in the shoulder lug 2 as a result of the insert casting. The fitting protrusions 2a are fitted in the fork tubes 3 and jointed thereto by an adhesive.

A front fork is a trunk of a bicycle frame. Therefore, dimensions and shapes of the front fork are limited to certain extents by specifications of bicycles, and sufficient strength as the trunk of the bicycle frame is required. Therefore, it is necessary to re-investigate the fundamental constitution of the bicycle frame in order to make light the bicycle frame considerably. For this purpose, specification of shoulder lug and selection of jointing systems are most important. According to the invention, the shoulder lug 2 is made of a light metal alloy (mostly aluminum alloy) and the die casting is employed for producing the lug 2. In die casting, the insert casting is possible. The stem tube can be insert-cast in the shoulder lug 2. As a result, at the same time that the shoulder lug 2 is formed, the stem tube 1 and the shoulder lug 2 are jointed without jointing operation. The principle of the jointing by the insert casting utilizes the difference in coefficient of thermal expansion between the two metal parts. Contraction force caused in solidification of aluminum within its elastic deformation embraces the stem tube 1 so that the stem tube is retained in the same manner as in a shrinkage fit to obtain the high jointing force.

FIG. 6 illustrates the jointed condition of these members. As the front fork is subjected to rotating and bending forces in addition to axial load, the jointed portions of the front fork must of course be rigid in order to obtain required functions of the front fork. According to the invention, therefore, a surface treatment is applied to the stem tube 1 for the purpose of improving the jointing force. There are various mechanical or chemical methods for the surface treatment. In this embodiment, the stem tube 1 is formed with a rough surface 5 by knurling which is simple and highly effective.

As shown in FIG. 6, each the fitting protrusion is formed as a hollow protrusion to be fitted in one of the fork tube 3.

FIG. 5 illustrates the stem tube 1 formed with the rough surface 5. FIG. 7 is an enlarged sectional view of the jointed portion of the stem tube 1 and the shoulder lug 2 shown in FIG. 6. As can be seen from the enlarged sectional view, the alloy is filled and solidified in depressions between protrusions of the rough surface to obtain a reliable jointed condition of the two members. The effects of the invention are as follows.

(1) The working itself is simple and applicable to actually used materials.

(2) The jointing force is remarkably improved. For example, a result of comparison test on the embracing force or strength which resist pulling forces is as follows.

Stem tube without the rough surface: about 2 tons
Stem tube with the rough surface: about 8 tons As the casting method is employed, the stem tube can be connected to the shoulder lug simultaneously with the formation of the shoulder lug. A "casting under pressure using metal dies", for example, the die casting is preferable. This is the reason why such a casting is superior in productivity, and the cast metal is dense in the internal structure and securely filled in the fine depressions at the jointed portions.

As can be seen from the above description, in forming a shoulder lug 2 by casting, a stem tube 1 is insert-cast in the lug and jointed thereto and at the same time, the shoulder lug 2 is integrally formed with fitting protrusions 2a which are to be fitted in fork tubes 3. After the fitting protrusions 2a are inserted into and jointed to the fork tubes 3 by an adhesive. Heating the members as in blazing is not needed. Accordingly, a front fork for a bicycle is obtained which is superior in durability without decline of the strength due to heating. Moreover, the shoulder lug 2 and fork tubes 3 can be made of a light metal alloy, so that a lightweight front fork is obtained. As the shoulder lug is made by die casting, the freedom of external appearance and shape can be improved. Moreover, the shoulder lug 2 and the fork tubes 3 are jointed by an adhesive, so that different materials for these members may be used. According to the invention, furthermore, centering and finishing operations are avoided or mitigated to improve the productivity and to reduce the cost of equipment, thereby lowering the cost of manufacturing bicycles. The present invention has the many superior effects.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A front fork for a bicycle, comprising a stem tube, a shoulder lug made of a light metal alloy by casting, said shoulder lug joined to said stem tube and embedded therein by insert casting, said shoulder lug being simultaneously integrally formed with fitting protrusions by casting, said stem tube formed with a rough surface in a part thereof embedded in the shoulder lug, and two fork tubes joined to said fitting protrusions of the shoulder lug by an adhesive with each said fitting protrusion formed as a hollow protrusion to be fitted in one of the fork tubes.

2. A front fork as set forth in claim 1, wherein said rough surface of the stem tube is formed by knurling.

* * * * *